W. D. SNOWMAN.
MUD GUARD.
APPLICATION FILED APR. 28, 1908.
904,654.  Patented Nov. 24, 1908.
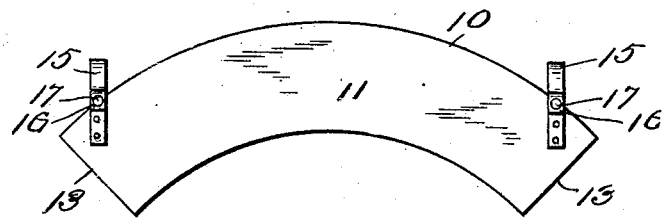
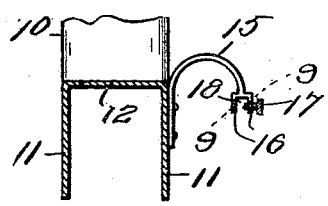
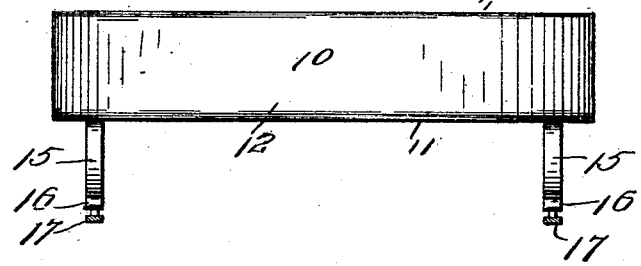
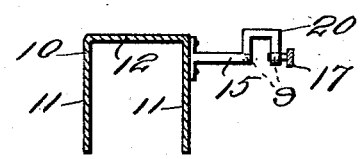
Witnesses
P. L. Armstrong
E. L. Chandlee
Inventor
W. D. Snowman
By Woodward & Chandlee
Attorneys
THE NORRIS PETERS CO., WASHINGTON, D. C.

UNITED STATES PATENT OFFICE.

WILLIAM D. SNOWMAN, OF ASHLAND, MAINE.

MUD-GUARD.

No. 904,654.  Specification of Letters Patent.  Patented Nov. 24, 1908.

Application filed April 28, 1908. Serial No. 429,688.

*To all whom it may concern:*

Be it known that I, WILLIAM D. SNOWMAN, a citizen of the United States, residing at Ashland, in the county of Aroostook and State of Maine, have invented certain new and useful Improvements in Mud-Guards, of which the following is a specification.

This invention relates to farming implements, and more particularly to those having gears rotated by chain connections, and has for its object to provide a suitable means for protecting such connections from damage by engagement therein of stones, dirt, or other injurious material.

A particular object of the invention is the provision of such an article which is detachable, and adapted to engagement with various types of machinery.

Another object is the creation of a simple structure of this type which may be manufactured at low cost from stock material.

Other objects and advantages will be apparent from the following description and it will be understood that changes in the specific structure shown and described may be made within the scope of the claims and that any suitable materials may be used without departing from the spirit of the invention.

In the drawings forming a portion of this specification, and in which like numerals of reference indicate similar parts in the several views, Figure 1 is a side view of the guard, Fig. 2 is a cross sectional view, Fig. 3 is a top view of the device, Fig. 4 is a side view of a modified form of the device.

Referring to the drawings, there is shown a casing 10 of sheet metal comprising spaced side portions 11, a top portion 12 connected with and extending therebetween, and an end portion 13. It will be understood that the casing may be made of various shapes for the purpose of inclosing revoluble gears, moving chains, reciprocating parts, and various other mechanisms required to be inclosed.

Secured to the outer sides of the wall 11 there are outwardly extending supporting portions 15 which may be made of malleable metal, or may comprise adjustable sections of nonmalleable material if desired. As shown, the members 15 comprise rods of iron yoke shape, one end being riveted to the walls 11 and the other end being bifurcated and provided with registering threaded openings 9 in the bifurcated extensions 16, adapted to receive threaded bolts 17 therethrough. The space 18 between the bifurcated portions is adapted to receive therein portions of stay rods or supporting frame-work adjacent to the parts over which the casing is to be adjusted. The bolt 17 may then be rotated to impinge against such portions engaged in the space 18 to retain the case in position, or engaged in the adjacent registering opening 9 to bind an engaged part between the portions 16. It will be understood that the support members 15 may be made of any shape desired, and in order to dispose the casing in proper position, it will be understood that any suitable securing means may be used in place of the bifurcated portion 16 and the bolts 17.

As shown in Fig. 5, the securing means comprise a laterally extending offset U shaped portion 20 secured to the end of the member 15, and adapted for engagement with supporting portions in a manner similar to that above described.

A particular object of this invention is to provide such a device especially adapted to use with potato diggers.

What is claimed is:—

1. As an article of manufacture, a mud guard for use in connection with potato diggers comprising an arcuate portion formed from sheet metal and including parallel sides and a connecting top, and supporting members secured to the outer face of one side portion of said arcuate member, said supporting members extending in parallel vertical planes, and having downwardly directed yokes at their ends distant from the arcuate member, said yokes being adapted for engagement with portions of a potato digger to support the mud guard, and set screws engaged in the yokes.

2. A mud guard for potato diggers comprising a shield stamped from sheet metal and including a longitudinally curved top and depending vertical sides carried by the edges of the top and lying in spaced parallel relation and supporting members secured to the outer face of one of said sides, each of said supporting members being secured to the side at one end and being curved upwardly and outwardly and then downwardly and having a yoke at the extremity of its downwardly curved portion, said supporting members extending in parallel vertical planes and projecting above the top of the shield at the end thereof.

In testimony whereof I affix my signature, in presence of two witnesses.

WILLIAM D. SNOWMAN.

Witnesses:
 HUGH HAYWARD,
 GEORGIE E. SNOWMAN.